US012748575B2

(12) United States Patent
Nigania

(10) Patent No.: US 12,748,575 B2
(45) Date of Patent: Sep. 29, 2026

(54) METHOD AND SYSTEM FOR PROVIDING AN AUTOMATED APPLICATION GENERATOR

(71) Applicant: JPMorgan Chase Bank, N.A., New York, NY (US)

(72) Inventor: Nihal Nigania, Wokingham (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 249 days.

(21) Appl. No.: 18/227,083

(22) Filed: Jul. 27, 2023

(65) Prior Publication Data

US 2025/0036370 A1 Jan. 30, 2025

(51) Int. Cl.

*G06F 8/34* (2018.01)
*G06F 8/61* (2018.01)
*G06F 8/73* (2018.01)
*G06F 8/76* (2018.01)

(52) U.S. Cl.

CPC .................. *G06F 8/34* (2013.01); *G06F 8/64* (2013.01); *G06F 8/73* (2013.01); *G06F 8/76* (2013.01)

(58) Field of Classification Search

CPC ..... G06F 8/34; G06F 8/73; G06F 8/30; G06F 8/36; G06F 8/64; G06F 8/71; G06F 8/76
USPC .......................................................... 717/109
See application file for complete search history.

(56) References Cited

U.S. PATENT DOCUMENTS

| | | | | |
|---|---|---|---|---|
| 10,621,014 B1 * | 4/2020 | Ramachandran | ......... | G06F 8/30 |
| 11,010,191 B1 * | 5/2021 | Hornbeck | ............. | H04L 67/133 |
| 11,204,715 B1 * | 12/2021 | Fawcett | ................ | G06F 3/0617 |
| 11,698,777 B2 * | 7/2023 | Mohiseen | ................. | G06F 8/36 717/107 |
| 12,229,537 B2 * | 2/2025 | Mohiseen | ................. | G06F 8/30 |
| 2007/0245323 A1 * | 10/2007 | Bertelrud | .................. | G06F 8/71 717/140 |
| 2012/0078737 A1 * | 3/2012 | Kulakowski | ........... | G06Q 20/24 705/16 |
| 2012/0297360 A1 * | 11/2012 | Lucco | ........................ | G06F 8/75 717/108 |
| 2014/0040791 A1 * | 2/2014 | Kim | .......................... | G06F 8/38 715/762 |
| 2018/0113684 A1 * | 4/2018 | Dawson | .................... | G06F 8/36 |
| 2018/0158138 A1 * | 6/2018 | Busevs | .................. | G06Q 40/03 |
| 2019/0250947 A1 * | 8/2019 | Bishop | ................ | G06F 9/45504 |
| 2021/0042096 A1 * | 2/2021 | White, III | ............... | H04L 67/10 |
| 2022/0012045 A1 * | 1/2022 | Rudraraju | ................. | G06F 8/36 |

(Continued)

*Primary Examiner* — Jason D Mitchell
(74) *Attorney, Agent, or Firm* — Greenblum & Bernstein, P.L.C.

(57) ABSTRACT

A method for facilitating automated application generation is disclosed. The method includes receiving, via a graphical user interface, a request to generate an application, the request including application requirements; identifying tenant information that corresponds to the request based on the application requirements, the tenant information including an infrastructure framework; configuring components that correspond to the infrastructure framework based on the application requirements; automatically generating the application by using the tenant information and the components; and generating documentation for the generated application, the documentation including data that relates to the tenant information, the components, and the generated application.

19 Claims, 5 Drawing Sheets

(56) References Cited

U.S. PATENT DOCUMENTS

| | | | | |
|---|---|---|---|---|
| 2023/0128753 | A1* | 4/2023 | Bawa | G06F 8/20<br>717/176 |
| 2023/0305820 | A1* | 9/2023 | Mohiseen | G06F 8/30 |
| 2024/0272887 | A1* | 8/2024 | Bawa | G06F 8/20 |

* cited by examiner

500

METHOD AND SYSTEM FOR PROVIDING AN AUTOMATED APPLICATION GENERATOR

BACKGROUND

1. Field of the Disclosure

This technology generally relates to methods and systems for generating applications, and more particularly to methods and systems for providing an application generator that leverages standardized tools, components, and automated processes to facilitate automated application generation.

2. Background Information

Many business entities operate complex systems such as, for example, settlement systems for trading financial products that need to handle various processes which vary across products, markets, and legal entities. Often, these complex systems are implemented in multi-tenant environments such as, for example, public cloud environments. Historically, implementations of conventional application management techniques for these complex systems have resulted in varying degrees of success with respect to minimizing deployment mistakes and/or misconfigurations while maximizing efficiency.

One drawback of the conventional application management techniques is that in many instances, each application team must build their own infrastructure in the complex systems to enable successful implementation of a corresponding application. As a result, deployment mistakes and/or misconfigurations are very likely. Additionally, due to the large number of individual infrastructures built, duplication of codes may result in lost productivity and resource.

Therefore, there is a need to provide an application generator that leverages standardized tools, components, and automated processes to facilitate automated generation of both application codes as well as corresponding infrastructure codes.

SUMMARY

The present disclosure, through one or more of its various aspects, embodiments, and/or specific features or sub-components, provides, inter alia, various systems, servers, devices, methods, media, programs, and platforms for providing an application generator that leverages standardized tools, components, and automated processes to facilitate automated application generation.

According to an aspect of the present disclosure, a method for facilitating automated application generation is disclosed. The method is implemented by at least one processor. The method may include receiving, via a graphical user interface, a request to generate an application, the request may include at least one application requirement; identifying tenant information that corresponds to the request based on the at least one application requirement, the tenant information may include at least one infrastructure framework; configuring at least one component that corresponds to the at least one infrastructure framework based on the at least one application requirement; automatically generating the application by using the tenant information and the at least one component; and generating documentation for the generated application, the documentation may include data that relates to at least one from among the tenant information, the at least one component, and the generated application.

In accordance with an exemplary embodiment, the tenant information may correspond to cloud resource data that are associated with a user group, the user group may relate to the request to generate the application.

In accordance with an exemplary embodiment, to identify the tenant information, the method may further include determining whether the tenant information that corresponds to the request is persisted in a repository; and generating the tenant information based on the at least one application requirement when the tenant information is not persisted in the repository.

In accordance with an exemplary embodiment, to generate the tenant information, the method may further include generating the at least one infrastructure framework based on an infrastructure as code process; identifying at least one from among a standardized tool, a standardized cloud component, and a standardized automation process; and generating at least one configurable application component and a corresponding service.

In accordance with an exemplary embodiment, the at least one component may include at least one required infrastructure component, the at least one required infrastructure component may include at least one from among a database instance, a server resource, and a secured path to store secured application data.

In accordance with an exemplary embodiment, to generate the application, the method may further include generating at least one base application structure by using the tenant information and the at least one component; and generating at least one default implementation for each of the at least one base application structure by using the tenant information, the at least one component, and a business context.

In accordance with an exemplary embodiment, the at least one base application structure and the corresponding at least one default implementation may be customized by provisioning at least one override based on the at least one application requirement.

In accordance with an exemplary embodiment, the method may further include determining at least one required dependency based on the tenant information; and configuring the at least one base application structure based on the at least one required dependency.

In accordance with an exemplary embodiment, the at least one required dependency may be automatically updated based on a dependency mapping that is associated with a cloud computing environment.

According to an aspect of the present disclosure, a computing device configured to implement an execution of a method for facilitating automated application generation is disclosed. The computing device including a processor; a memory; and a communication interface coupled to each of the processor and the memory, wherein the processor may be configured to receive, via a graphical user interface, a request to generate an application, the request may include at least one application requirement; identify tenant information that corresponds to the request based on the at least one application requirement, the tenant information may include at least one infrastructure framework; configure at least one component that corresponds to the at least one infrastructure framework based on the at least one application requirement; automatically generate the application by using the tenant information and the at least one component; and generate documentation for the generated application, the documentation may include data that relates to at least one from among the tenant information, the at least one component, and the generated application.

In accordance with an exemplary embodiment, the tenant information may correspond to cloud resource data that are associated with a user group, the user group may relate to the request to generate the application.

In accordance with an exemplary embodiment, to identify the tenant information, the processor may be further configured to determine whether the tenant information that corresponds to the request is persisted in a repository; and generate the tenant information based on the at least one application requirement when the tenant information is not persisted in the repository.

In accordance with an exemplary embodiment, to generate the tenant information, the processor may be further configured to generate the at least one infrastructure framework based on an infrastructure as code process; identify at least one from among a standardized tool, a standardized cloud component, and a standardized automation process; and generate at least one configurable application component and a corresponding service.

In accordance with an exemplary embodiment, the at least one component may include at least one required infrastructure component, the at least one required infrastructure component may include at least one from among a database instance, a server resource, and a secured path to store secured application data.

In accordance with an exemplary embodiment, to generate the application, the processor may be further configured to generate at least one base application structure by using the tenant information and the at least one component; and generate at least one default implementation for each of the at least one base application structure by using the tenant information, the at least one component, and a business context.

In accordance with an exemplary embodiment, the processor may be further configured to customize the at least one base application structure and the corresponding at least one default implementation by provisioning at least one override based on the at least one application requirement.

In accordance with an exemplary embodiment, the processor may be further configured to determine at least one required dependency based on the tenant information; and configure the at least one base application structure based on the at least one required dependency.

In accordance with an exemplary embodiment, the processor may be further configured to automatically update the at least one required dependency based on a dependency mapping that is associated with a cloud computing environment.

According to an aspect of the present disclosure, a non-transitory computer readable storage medium storing instructions for facilitating automated application generation is disclosed. The storage medium including executable code which, when executed by a processor, may cause the processor to receive, via a graphical user interface, a request to generate an application, the request may include at least one application requirement; identify tenant information that corresponds to the request based on the at least one application requirement, the tenant information may include at least one infrastructure framework; configure at least one component that corresponds to the at least one infrastructure framework based on the at least one application requirement; automatically generate the application by using the tenant information and the at least one component; and generate documentation for the generated application, the documentation may include data that relates to at least one from among the tenant information, the at least one component, and the generated application.

In accordance with an exemplary embodiment, the tenant information may correspond to cloud resource data that are associated with a user group, the user group may relate to the request to generate the application.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
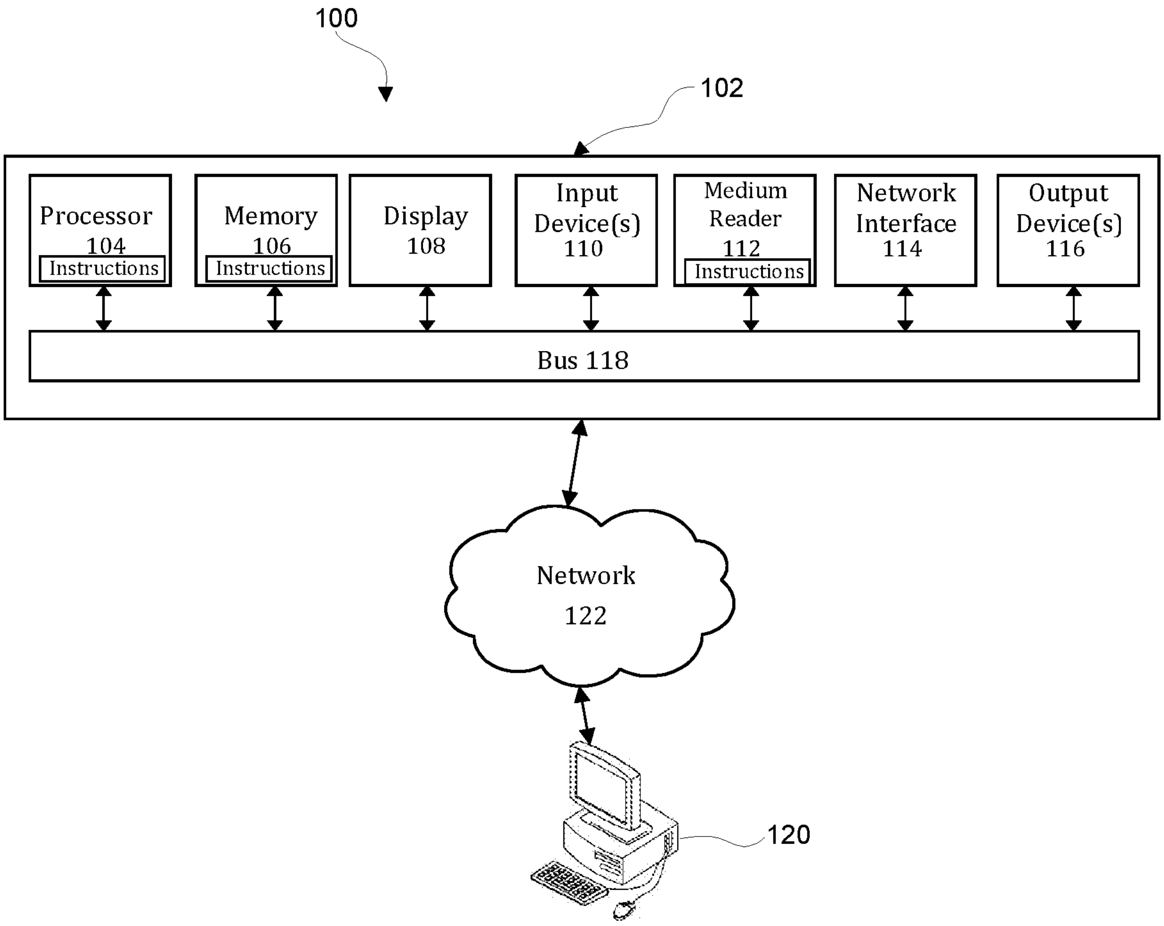
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed)

network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks

122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing an application generator that leverages standardized tools, components, and automated processes to facilitate automated application generation.

Figure 2:
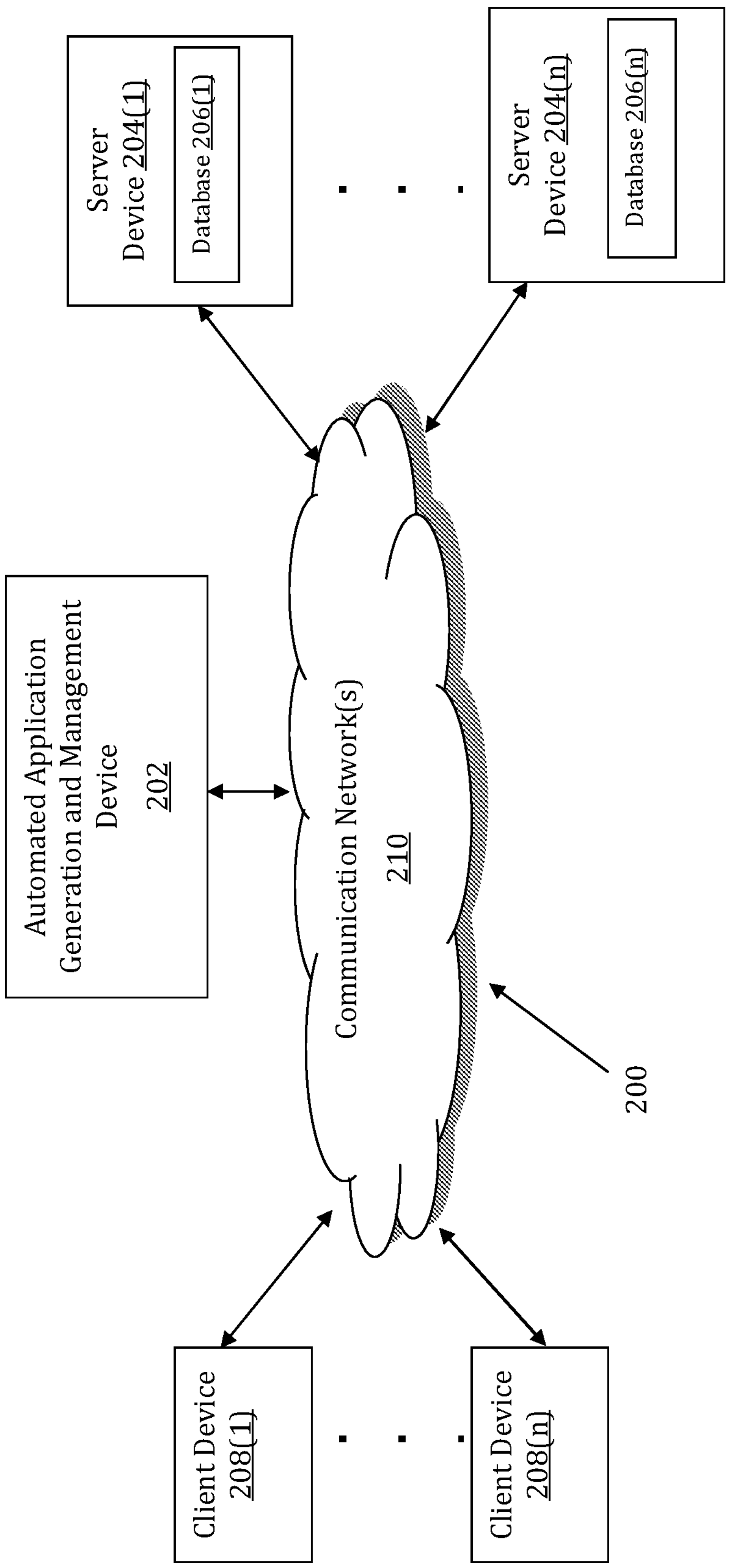
FIG. 2 illustrates an exemplary diagram of a network environment.

Referring to FIG. 2, a schematic of an exemplary network environment 200 for implementing a method for providing an application generator that leverages standardized tools, components, and automated processes to facilitate automated application generation is illustrated. In an exemplary embodiment, the method is executable on any networked computer platform, such as, for example, a personal computer (PC).

The method for providing an application generator that leverages standardized tools, components, and automated processes to facilitate automated application generation may be implemented by an Automated Application Generation and Management (AAGM) device 202. The AAGM device 202 may be the same or similar to the computer system 102 as described with respect to FIG. 1. The AAGM device 202 may store one or more applications that can include executable instructions that, when executed by the AAGM device 202, cause the AAGM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AAGM device 202 itself, may be located in virtual server(s) running in a cloud-based computing environment rather than being tied to one or more specific physical network computing devices. Also, the application(s) may be running in one or more virtual machines (VMs) executing on the AAGM device 202. Additionally, in one or more embodiments of this technology, virtual machine(s) running on the AAGM device 202 may be managed or supervised by a hypervisor.

In the network environment 200 of FIG. 2, the AAGM device 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the AAGM device 202, such as the network interface 114 of the computer system 102 of FIG. 1, operatively couples and communicates between the AAGM device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AAGM device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AAGM devices that efficiently implement a method for providing an application generator that leverages standardized tools, components, and automated processes to facilitate automated application generation.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AAGM device 202 may be a standalone device or integrated with one or more other devices or apparatuses, such as one or more of the server devices 204(1)-204(*n*), for example. In one particular example, the AAGM device 202 may include or be hosted by one of the server devices 204(1)-204(*n*), and other arrangements are also possible. Moreover, one or more of the devices of the AAGM device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the AAGM device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store data that relates to requests, applications, application requirements, tenant information, infrastructure framework, components, documentations, and cloud resource data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a controller/agent approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the AAGM device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the AAGM device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the AAGM device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AAGM device 202, the server devices 204(1)-204(*n*), or the client devices 208(1)-208(*n*), for example, may be configured to operate as virtual instances on the same physical machine. In other words, one or more of the AAGM device 202, the server devices 204(1)-204(*n*), or the client devices 208(1)-208(*n*) may operate on the same physical device rather than as separate devices communicating through communication network(s) 210. Additionally, there may be more or fewer AAGM devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
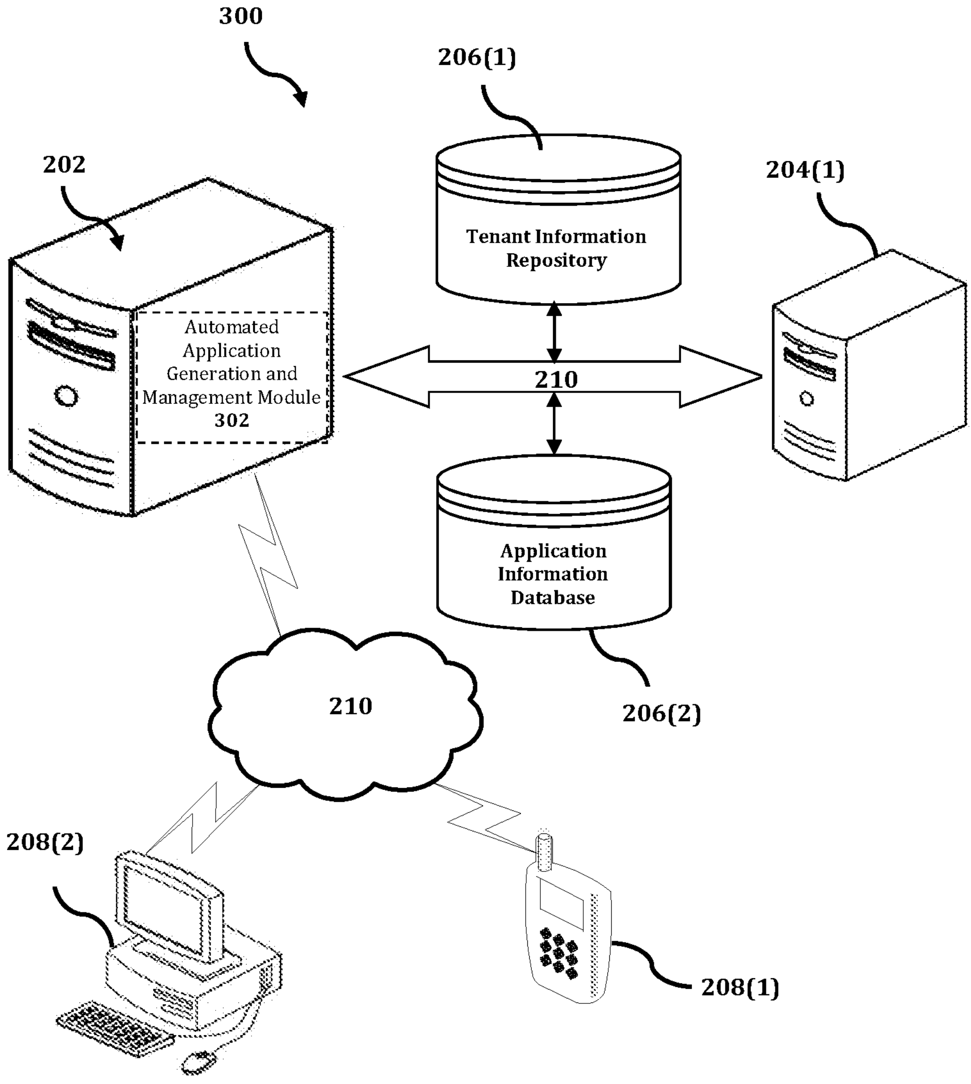
FIG. 3 shows an exemplary system for implementing a method for providing an application generator that leverages standardized tools, components, and automated processes to facilitate automated application generation.

The AAGM device 202 is described and shown in FIG. 3 as including an automated application generation and management module 302, although it may include other rules, policies, modules, databases, or applications, for example. As will be described below, the automated application generation and management module 302 is configured to implement a method for providing an application generator that leverages standardized tools, components, and automated processes to facilitate automated application generation.

An exemplary process 300 for implementing a mechanism for providing an application generator that leverages standardized tools, components, and automated processes to facilitate automated application generation by utilizing the network environment of FIG. 2 is shown as being executed in FIG. 3. Specifically, a first client device 208(1) and a second client device 208(2) are illustrated as being in communication with AAGM device 202. In this regard, the first client device 208(1) and the second client device 208(2) may be "clients" of the AAGM device 202 and are described herein as such. Nevertheless, it is to be known and understood that the first client device 208(1) and/or the second client device 208(2) need not necessarily be "clients" of the AAGM device 202, or any entity described in association therewith herein. Any additional or alternative relationship may exist between either or both of the first client device 208(1) and the second client device 208(2) and the AAGM device 202, or no relationship may exist.

Further, AAGM device 202 is illustrated as being able to access a tenant information repository 206(1) and an application information database 206(2). The automated application generation and management module 302 may be configured to access these databases for implementing a method for providing an application generator that leverages standardized tools, components, and automated processes to facilitate automated application generation.

The first client device 208(1) may be, for example, a smart phone. Of course, the first client device 208(1) may be any additional device described herein. The second client device 208(2) may be, for example, a PC. Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AAGM device 202 via broadband or cellular communication. Of course, these embodiments are merely exemplary and are not limiting or exhaustive.

Upon being started, the automated application generation and management module 302 executes a process for providing an application generator that leverages standardized tools, components, and automated processes to facilitate automated application generation. An exemplary process for providing an application generator that leverages standardized tools, components, and automated processes to facilitate automated application generation is generally indicated at flowchart 400 in FIG. 4.

Figure 4:
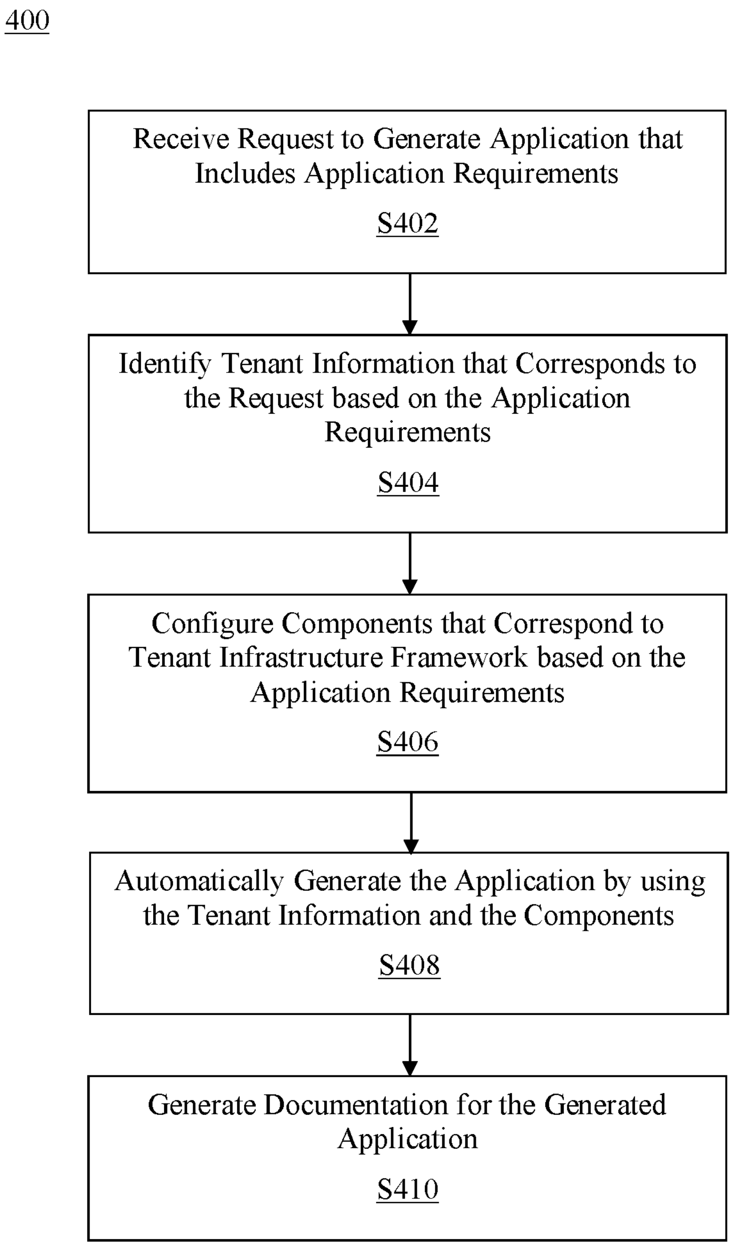
FIG. 4 is a flowchart of an exemplary process for implementing a method for providing an application generator that leverages standardized tools, components, and automated processes to facilitate automated application generation.

In the process 400 of FIG. 4, at step S402, requests to generate an application may be received. In an exemplary embodiment, the requests may be received via a graphical user interface. The requests may include application requirements. The application requirements may relate to necessary application characteristics as described in the requests. The necessary application characteristics may be defined based on user preferences that relate to application functionalities in view of a business context. For example, the application requirements for an application in a settlement system may define transaction parameters consistent with a business context that is associated with the settlement system.

In another exemplary embodiment, the graphical user interface may relate to an application provisioner user interface. The application provisioner user interface may include a common user interface that provides application teams with self-service capabilities to generate a standard application at the click of a button. The application may be ready for deployment in a common platform that is built consistent with present disclosures.

In another exemplary embodiment, the provisioner user interface may include a kick-starter user interface. The kick-starter user interface may be configured to perform various functions consistent with present disclosures. The functions performable via the kick-starter user interface may include at least one from among a first function to associate business context and generate a base implementation of an application; a second function to provide implementation of all well-known industry standard formats; a third function to generate the infrastructure needed by the system; a fourth function to provide a default continuous integration and continuous deployment (CI/CD) pipeline, and a fifth function that wires dependencies as well as all application components with infrastructure components to reduce resource expenditures.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, tenant information that corresponds to each of the requests may be identified. In an exemplary embodiment, the tenant information may correspond to cloud resource data that are associated with a user group such as, for example, a line of business. The user group may relate to the request to generate the application. For example, the tenant information may relate to cloud resource data that are associated with the line of business that requested generation of the application.

In another exemplary embodiment, the tenant information may be identified based on the application requirements. The tenant information may include an infrastructure framework. The infrastructure framework may relate to generated tenant infrastructures consistent with present disclosures.

In another exemplary embodiment, to identify the tenant information, a determination may be made as to whether the tenant information that corresponds to the requests is persisted in a repository. The existence of the tenant information that corresponds to the requests in the repository may indicate that the requested tenant information was previously generated. For example, a previously submitted similar request may have resulted in the generation of the required tenant information. By persisting previously generated tenant infrastructures, code duplication may be prevented for instances of multiple similar requests from a single user group. Prevention of code duplication may result in efficient resource usage and allocations.

Alternatively, when the tenant information is not persisted in the repository, the required tenant information may be generated. The required tenant information may be generated based on the application requirements. The non-existence of the tenant information in the repository may indicate that the requested tenant information was not previously generated. As such, in this instance, generation of the tenant information and corresponding infrastructure framework may be required.

In another exemplary embodiment, to generate the tenant information, the infrastructure framework may be generated based on an infrastructure as code process. The infrastructure framework and corresponding infrastructure steps may be automatically generated as infrastructure as code. Then, various tools, components, and processes may be identified. The tools may relate to standardized tools, the components may relate to standardized cloud components, and the processes may relate to standardized automation processes. Further, configurable application components and corresponding services such as, for example, common services may be generated. The configurable application components and common services may be generated for reusability.

In another exemplary embodiment, the tenant information may relate to cloud resource data for a single tenant configuration. The single tenant configuration may relate to a single instance of software and corresponding support infrastructure that serves a single user group such as, for example, a single line of business. In the single tenant configuration, each user group is assigned an independent database and instance of the software, which does not enable sharing with other user groups. The single tenant configuration may improve security because a single user group and a single server are contained on secured hardware that is utilized by a limited number of personnel. Similarly, with an entire environment dedicated to one user group, resources are abundant and available at any time.

In another exemplary embodiment, the tenant information may relate to cloud resource data for a multi-tenant configuration. The multi-tenant configuration may relate to a single instance of software and corresponding support infrastructure that serves multiple user groups. In the multi-tenant configuration, each user group shares the software application and also shares a single database. Data for each of the user groups may be isolated and remains invisible to other user groups. The multi-tenant configuration may improve resource allocations because multiple user groups mean that the cost for the environment is shared. Similarly, the multi-tenant configuration may improve integrations because cloud environments allow for easier integration with other applications through the use of application programming interfaces.

At step S406, components that correspond to the infrastructure framework may be configured. The components may be configured based on the application requirements. In an exemplary embodiment, the components may include required infrastructure components for operability in a system such as, for example, a settlement system. The required infrastructure components for the system may be generated and configured to ensure operability with the system. The required infrastructure components may include at least one from among a database instance, a server resource, and a secured path to store secured application data. The secured path may relate to a secrets path to store application secrets.

At step S408, the application may be automatically generated by using the tenant information and the configured components. In an exemplary embodiment, to facilitate the generating of the application, a base application structure may be generated by using the tenant information and the configured components. Likewise, a default implementation may be generated for the base application structure by using the tenant information, the configured components, and a business context.

In another exemplary embodiment, the associated business context may be usable to facilitate the generation of an application. For example, the associated business context may be usable to facilitate the generation of a default implementation of a settlement application in a settlement system. In another exemplary embodiment, the base application structure and the corresponding default implementation may be customized by provisioning overrides based on the application requirements. For example, the infrastructure may be customized by the respective settlement system teams by provisioning overrides via configurations according to the application requirements.

In another exemplary embodiment, required dependencies may be determined based on the tenant information. The required dependencies may relate to software dependencies that include a relationship between software components where one component relies on another to function properly. For example, when a software application uses a library to query a database, the application depends on that library. Then, the base application structure may be configured based on the required dependencies.

In another exemplary embodiment, the required dependencies may be automatically updated based on a dependency mapping that is associated with a cloud computing environment. The required dependencies of a new computing environment may be automatically detected to facilitate the automated updating. For example, when an underlying system such as a settlement system is moved to a different cloud provider, the required dependencies of the new provider may be automatically detected and mapped to facilitate the automated updating.

In another exemplary embodiment, consistent with present disclosures, the application generator may facilitate the wiring of all the dependencies requires by a cloud system such as, for example, a cloud settlement system. The application generator may automatically wire dependencies as well as all application components with infrastructure components without additional user input. Due to dependency management being one of the most critical components, managing the process automatically may reduce errors associated with manual manipulations and improve resource efficiency.

At step S410, documentation for the generated application may be generated. In an exemplary embodiment, the documentation may include material that provides information and/or evidence that serves as a record of the application generation process. The documentation may include data that relates to at least one from among the tenant information, the configured components, and the generated application.

In another exemplary embodiment, the documentation may be generated as an application configuration file that includes formatting information related to the generated application. The configuration file may outline the characteristics and functionalities of the generated application to let a developer know exactly what components have been generated and how those components have been integrated. For example, the documentation may include generated software codes that are used by the application as well as application specific nodes and structures such as corresponding databases that have been configured for the application.

Figure 5:
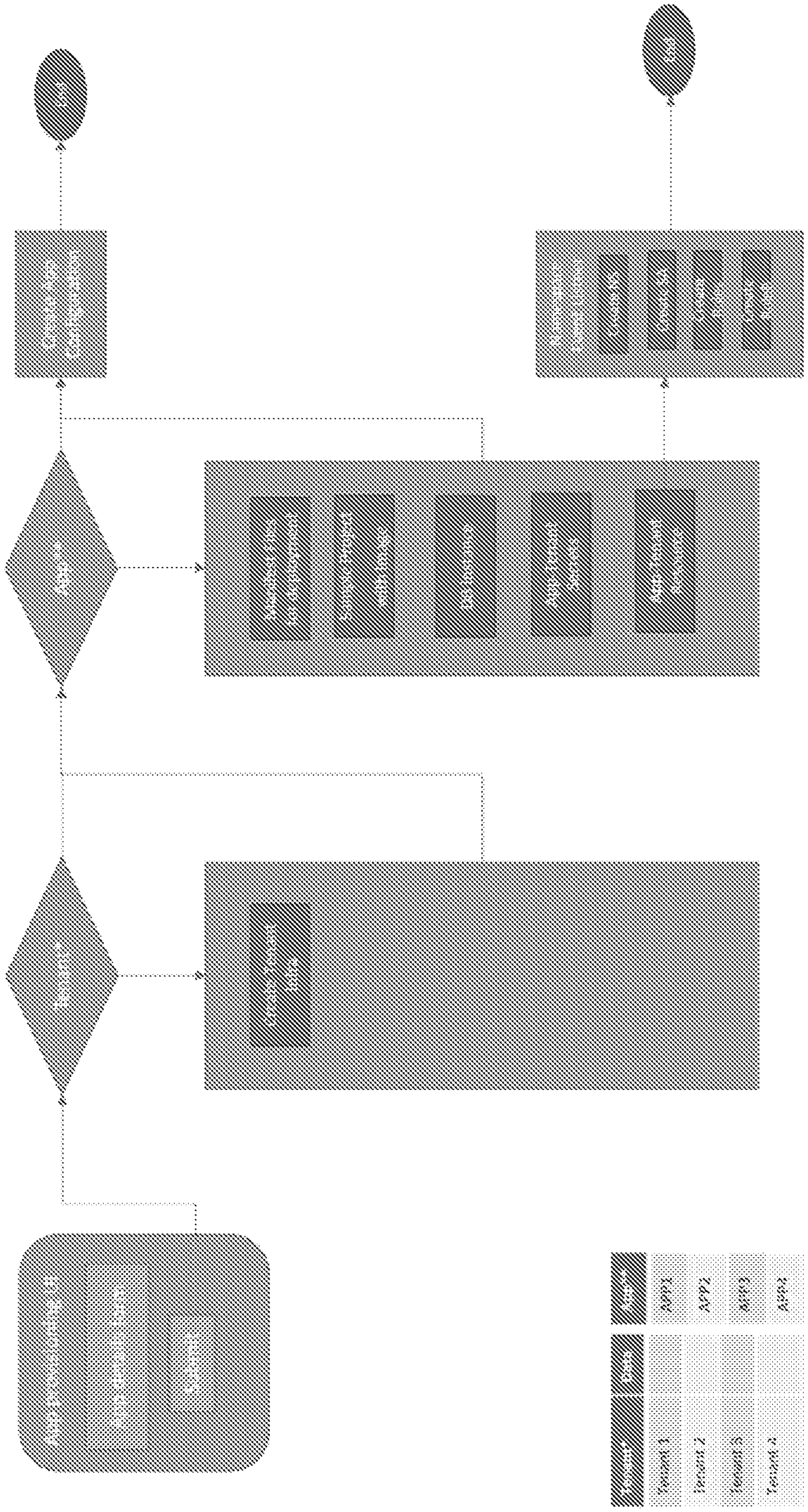
FIG. 5 is an application onboarding flow diagram of an exemplary process for implementing a method for providing an application generator that leverages standardized tools, components, and automated processes to facilitate automated application generation.

FIG. 5 is an application onboarding flow diagram 500 of an exemplary process for implementing a method for providing an application generator that leverages standardized tools, components, and automated processes to facilitate automated application generation. In FIG. 5, application onboarding may relate to a process that is usable by developers of a line of business to generate an application on a standard infrastructure consistent with present disclosures. Onboarding of new lines of business on existing infrastructure may speed-up development time as well as time to market.

Consistent with present disclosures, a standard infrastructure may be leveraged to accelerate the delivery of applications and produce business value. An infrastructure-specific development team such as, for example, a platform engineering team may implement automated creation of infrastructure steps as infrastructure as code. Similarly, the infrastructure-specific development team my standardize tools, standardize components, and standardize automated processes. Further, the infrastructure-specific development team may create reusable configurable application components and common services.

The standard infrastructure may be customized for various application requirements by provisioning overrides based on configurations processed via an application provisioner user interface. The application provisioner user interface may include a common user interface that provides application teams with self-service capabilities to generate a standard application at the click of a button. The application may be ready for deployment in the standard infrastructure that is built consistent with present disclosures.

The provisioner user interface may also include a kick-starter user interface. The kick-starter user interface may be configured to perform various functions consistent with present disclosures. The functions performable via the kick-starter user interface may include at least one from among a first function to associate business context and generate a base implementation of an application; a second function to provide implementation of all well-known industry standard formats; a third function to generate the infrastructure needed by the system; a fourth function to provide a default continuous integration and continuous deployment (CI/CD) pipeline, and a fifth function that wires dependencies as well as all application components with infrastructure components to reduce resource expenditures.

As illustrated in FIG. 5, the application provisioning user interface may be usable to receive application requirements via an application details form that is submitted by a line of business. The application details form may be submitted to request generation of an application. By using information in the application details form, a determination may be made as to whether tenant information currently exists for the line of business. When the tenant information does not currently exist, new tenant information may be generated together with a corresponding tenant infrastructure.

Then, by using the tenant information, another determination may be made as to whether a matching application currently exist that satisfies the application requirements. When the matching application does not currently exist, a new application may be generated. Together with the new application, various required application components are also generated and configured to ensure operability with the standard infrastructure. For example, to facilitate the generation of the application, various actions may be initiated such as manifesting files for deployment, sampling project with image, generating a database instance, identifying application/tenant secrets, and configuring application/tenant resources.

Finally, after generation of the application, an application configuration file may be generated. The application configuration file may outline the characteristics and functionalities of the generated application to let the line of business know exactly what components have been generated and how those components have been integrated. For example, the application configuration file may include generated software codes that are used by the application as well as application specific nodes and structures such as corresponding databases that have been configured for the application.

Accordingly, with this technology, an optimized process for providing an application generator that leverages standardized tools, components, and automated processes to facilitate automated application generation is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automated application generation, the method being implemented by at least one processor, the method comprising:

persisting, by the at least one processor, generated tenant infrastructures over a predetermined period of time;

receiving, by the at least one processor via a graphical user interface, a request to generate an application, the request including at least one application requirement;

identifying, by the at least one processor, tenant information that corresponds to the request based on the at least one application requirement, the tenant information including at least one infrastructure framework;

comparing, by the at least one processor, the identified tenant information to the persisted generated tenant infrastructures to determine whether the identified tenant information was previously generated;

when a determination is made that the identified tenant information was not previously generated:

configuring, by the at least one processor, at least one component that corresponds to the at least one infrastructure framework based on the at least one application requirement;

automatically generating, by the at least one processor, the application by using the tenant information and the at least one component, wherein the application is implemented in a first cloud system, wherein the generating of the application includes:

determining, by the at least one processor, a business context associated with the request;

generating, by the at least one processor, a base implementation of the application based on the determined business context;

implementing, by the at least one processor, industry standard formats into the base implementation of the application based on the determined business context;

implementing, by the at least one processor, a continuous integration and continuous deployment pipeline into the application;

automatically detecting, by the at least one processor, required dependencies of the application;

mapping, by the at least one processor, the required dependencies of the application;

automatically updating, by the at least one processor, the required dependencies of the application based on a result of the mapping, wherein the updating includes automatically reforming required dependencies of the application when the application is moved from being implemented in the first cloud system to being implemented in a second cloud system; and automatically wiring, by the at least one processor, the updated required dependencies with the at least one component;

customizing, by the at least one processor, the generated application by provisioning at least one override based on the at least one application requirement; and generating, by the at least one processor, documentation for the generated application, the documentation including data that relates to at least one from among the tenant information, the at least one component, and the generated application, wherein the documentation is generated as an application configuration file that includes formatting information related to the generated application; and when a determination is made that the identified tenant information was previously generated:

stopping, by the at least one processor, the facilitating of the automated application generation.

2. The method of claim 1, wherein the tenant information corresponds to cloud resource data that are associated with a user group, the user group relating to the request to generate the application.

3. The method of claim 1, further comprising:

automatically generating, by the at least one processor, the at least one infrastructure framework as infrastructure as code;

identifying, by the at least one processor via the infrastructure as code, at least one from among a standardized tool, a standardized cloud component, and a standardized automation process; and generating, by the at least one processor via the infrastructure as code, at least one configurable application component and a corresponding service.

4. The method of claim 1, wherein the at least one component includes at least one required infrastructure component, the at least one required infrastructure component including at least one from among a database instance, a server resource, and a secured path to store secured application data.

5. The method of claim 1, wherein the generating of the application further comprises:

generating, by the at least one processor, at least one base application structure by using the tenant information and the at least one component; and generating, by the at least one processor, at least one default implementation for each of the at least one base application structure by using the tenant information, the at least one component, and a business context.

6. The method of claim 5, wherein the at least one base application structure and the corresponding at least one default implementation are customized by provisioning the at least one override based on the at least one application requirement.

7. The method of claim 5, further comprising:

configuring, by the at least one processor, the at least one base application structure based on the required dependencies.

8. The method of claim 7, wherein the mapping of the dependencies is associated with a cloud computing environment.

9. The method of claim 1, wherein the at least one application requirement defines transaction parameters consistent with a business context associated with a settlement system.

10. A computing device configured to implement an execution of a method for facilitating automated application generation, the computing device comprising:

a processor;

a memory; and a communication interface coupled to each of the processor and the memory, wherein the processor is configured to:

persist generated tenant infrastructures over a predetermined period of time;

receive, via a graphical user interface, a request to generate an application, the request including at least one application requirement;

identify tenant information that corresponds to the request based on the at least one application requirement, the tenant information including at least one infrastructure framework;

compare the identified tenant information to the persisted generated tenant infrastructures to determine whether the identified tenant information was previously generated;

when a determination is made that the identified tenant information was not previously generated:

configure at least one component that corresponds to the at least one infrastructure framework based on the at least one application requirement;

automatically generate the application by using the tenant information and the at least one component, wherein the application is implemented in a first cloud system, wherein the generating of the application includes:

determining a business context associated with the request;

generating a base implementation of the application based on the determined business context;

implementing industry standard formats into the base implementation of the application based on the determined business context;

implementing a continuous integration and continuous deployment pipeline into the application;

automatically detecting required dependencies of the application;

mapping the required dependencies of the application;

automatically updating the required dependencies of the application based on a result of the mapping, wherein the updating includes automatically reforming required dependencies of the application when the application is moved from being implemented in the first cloud system to being implemented in a second cloud system; and automatically wiring the updated required dependencies with the at least one component;

customize the generated application by provisioning at least one override based on the at least one application requirement; and generate documentation for the generated application, the documentation including data that relates to at least one from among the tenant information, the at least one component, and the generated application, wherein the documentation is generated as an application configuration file that includes formatting information related to the generated application; and when a determination is made that the identified tenant information was previously generated:

stop the facilitating of the automated application generation.

11. The computing device of claim 10, wherein the tenant information corresponds to cloud resource data that are associated with a user group, the user group relating to the request to generate the application.

12. The computing device of claim 10, wherein the processor is further configured to:

automatically generate the at least one infrastructure framework as infrastructure as code;

identify, via the infrastructure as code, at least one from among a standardized tool, a standardized cloud component, and a standardized automation process; and generate, via the infrastructure as code, at least one configurable application component and a corresponding service.

13. The computing device of claim 10, wherein the at least one component includes at least one required infrastructure component, the at least one required infrastructure component including at least one from among a database instance, a server resource, and a secured path to store secured application data.

14. The computing device of claim 10, wherein, to generate the application, the processor is further configured to:

generate at least one base application structure by using the tenant information and the at least one component; and generate at least one default implementation for each of the at least one base application structure by using the tenant information, the at least one component, and a business context.

15. The computing device of claim 14, wherein the processor is further configured to customize the at least one base application structure and the corresponding at least one default implementation by provisioning the at least one override based on the at least one application requirement.

16. The computing device of claim 14, wherein the processor is further configured to:

configure the at least one base application structure based on the required dependencies.

17. The computing device of claim 16, wherein the mapping of the dependencies is associated with a cloud computing environment.

18. A non-transitory computer readable storage medium storing instructions for facilitating automated application generation, the storage medium comprising executable code which, when executed by a processor, causes the processor to:

persist generated tenant infrastructures over a predetermined period of time;

receive, via a graphical user interface, a request to generate an application, the request including at least one application requirement;

identify tenant information that corresponds to the request based on the at least one application requirement, the tenant information including at least one infrastructure framework;

compare the identified tenant information to the persisted generated tenant infrastructures to determine whether the identified tenant information was previously generated;

when a determination is made that the identified tenant information was not previously generated:

configure at least one component that corresponds to the at least one infrastructure framework based on the at least one application requirement;

automatically generate the application by using the tenant information and the at least one component, wherein the application is implemented in a first cloud system, wherein the generating of the application includes:

determining a business context associated with the request;

generating a base implementation of the application based on the determined business context;

implementing industry standard formats into the base implementation of the application based on the determined business context;

implementing a continuous integration and continuous deployment pipeline into the application;

automatically detecting required dependencies of the application;

mapping the required dependencies of the application;

automatically updating the required dependencies of the application based on a result of the mapping, wherein the updating includes automatically reforming required dependencies of the application when the application is moved from being implemented in the first cloud system to being implemented in a second cloud system; and automatically wiring the updated required dependencies with the at least one component;

customize the generated application by provisioning at least one override based on the at least one application requirement; and generate documentation for the generated application, the documentation including data that relates to at least one from among the tenant information, the at least one component, and the generated application, wherein the documentation is generated as an application configuration file that includes formatting information related to the generated application; and when a determination is made that the identified tenant information was previously generated:

stop the facilitating of the automated application generation.

19. The storage medium of claim 18, wherein the tenant information corresponds to cloud resource data that are associated with a user group, the user group relating to the request to generate the application.

* * * * *